United States Patent [19]

Strong, Jr. et al.

[11] Patent Number: 5,605,179
[45] Date of Patent: Feb. 25, 1997

[54] INTEGRATED GAS PANEL

[75] Inventors: Benjamin R. Strong, Jr., Sunnyvale; Brent D. Elliot, Santa Clara; Frank R. Balma, San Jose, all of Calif.

[73] Assignee: Insync Systems, Inc., Santa Clara, Calif.

[21] Appl. No.: 404,485

[22] Filed: Mar. 17, 1995

[51] Int. Cl.$^6$ .................................................. F16K 11/10
[52] U.S. Cl. ............................................ 137/884; 137/240
[58] Field of Search ..................................... 137/240, 884

[56] References Cited

U.S. PATENT DOCUMENTS

| | | | |
|---|---|---|---|
| 3,915,194 | 10/1975 | Friedrich | 137/884 |
| 4,657,047 | 4/1987 | Kolibas | 137/240 |
| 5,301,717 | 4/1994 | Goedecke | 137/883 |
| 5,368,062 | 11/1994 | Okumura et al. | 137/240 |
| 5,439,026 | 8/1995 | Moriya et al. | 137/884 |

OTHER PUBLICATIONS

Advertising material by Ultra Clean Technology, dated at least Jul., 1994.

Primary Examiner—John C. Fox
Attorney, Agent, or Firm—Blakely, Sokoloff, Taylor & Zafman

[57] ABSTRACT

A novel integrated gas panel is described. The integrated gas panel of the present invention, comprises a plurality of individual process gas modules or blocks coupled together with a plurality of gaskets located between them. Each process gas module comprises an upstream isolation valve coupled between a process gas inlet and an MFC inlet. An upstream purge valve is coupled between an upstream purge port and the MFC inlet. A mass flow controller is coupled between the MFC inlet and an MFC outlet. A mix isolation valve is coupled between the MFC outlet and a mix port. The modules are coupled together such that respective ports of each module are in fluid communication with one another to form a common tube or port. Gaskets placed between the various modules either allow or block the flow of gas between ports of adjacent modules. By arranging blocks and gaskets in different ways, gas panels with a wide variety of different functions and capabilities can be easily designed and fabricated.

3 Claims, 11 Drawing Sheets

5,605,179

INTEGRATED GAS PANEL

BACKGROUND OF THE INVENTION

1. Field of the Invention

The present invention relates to the field of gas delivery systems, and more specifically, to an integrated gas panel comprising modular components.

2. Discussion of Related Art

Gas panels are used to control the flow of gases and gas mixtures in many manufacturing processes and machinery. A typical gas panel, such as shown in FIG. 1, is made up of literally hundreds of discreet or individual components, such as valves 102, filters 104, flow regulators 106, pressure transducers 109, and connections 108, connected together by tens of feet of tubing 110. Gas panels are designed to provide desired functions, such as mixing and purging, by uniquely configuring the various discreet components.

A problem with the present gas panels is that they are all uniquely designed and configured to meet specific needs. Today there is simply no standard design methodology in which gas panels are configured. As such, no two gas panels are the same. Today it takes weeks to months to design a gas panel, fabricate all subassemblies, and then assemble the final product. Uniquely designing or configuring each new gas panel costs time and money. Additionally, the lack of a standard design makes it difficult for facilities' personnel to maintain, repair, and retrofit all the differently designed gas panels which may exist in a single facility.

Another problem associated with present gas panel designs is the excessive amount of tubing used to route gas throughout the gas panel. Large volumes of tubing require large volumes of gas to fill the system and make it difficult to stabilize and control gas flows. Additionally, gas panels with excessive tubing require significant amounts of time to purge and isolate which can result in expensive downtime of essential manufacturing equipment. Still further, the more tubing a gas panel has, the more "wetted surface area" it has which increases its likelihood of being a source of contamination in a manufacturing process.

Yet another problem associated with present gas panels is that they generally fail to provide desirable functions and capability. For example, in present gas panels it is impossible to check a Mass Flow Controller (MFC) for accuracy and operability without removing the MFC from the gas panel. In present gas panels the simple removal of an MFC requires a significant amount of time to first purge and isolate the system. Additionally, present gas panels do not have the ability to sample gases for contamination, nor do they have the ability to vent the system to stabilize gas flows.

Thus, what is required is a gas panel which has a standard design, requires very little tubing, and can provide desirable functions and capabilities, such as mixing, purging and venting.

SUMMARY OF THE INVENTION

A novel integrated gas panel is described. The preferred embodiment of the integrated gas panel of the present invention comprises a plurality of individual process gas modules, inert gas modules, and a purge gas module which are coupled together with a plurality of gaskets coupled between them.

Each process gas module preferably has an upstream isolation valve coupled between a process gas inlet and an MFC inlet and an upstream purge valve coupled between an upstream purge port and the MFC inlet. A mass flow controller is coupled between the MFC inlet and an MFC outlet. A mix isolation valve is coupled between the MFC outlet and a mix port.

Each inert gas module preferably comprises an upstream isolation valve coupled between an inert gas inlet and a MFC inlet. A mass flow controller is coupled between the MCF inlet and a MFC outlet. Mix isolation valve is coupled between the MFC outlet and a mix port.

The purge gas module preferably has an upstream isolation valve coupled between a purge gas inlet, an upstream purge port, an upstream vacuum valve coupled between the upstream purge port, and a purge gas outlet. A downstream vacuum valve is coupled between the purge gas outlet and a purge divert port. A downstream isolation valve is coupled between the purge gas inlet and the purge divert port.

The process gas modules, inert gas modules, and purge gas modules are coupled together so that respective ports are in fluid communication. The ports couple together to form a common tube or passage for a particular function, such as purge passages and mix passages. Gaskets located between the modules either block or allow the flow of gas between ports of the adjacent blocks. Modules and gaskets are arranged to provide a gas panel with desired capabilities and functions.

BRIEF DESCRIPTION OF THE DRAWINGS

FIG. 3b is a functional diagram of the process gas module shown in FIG. 3a.

DETAILED DESCRIPTION OF THE PRESENT INVENTION

The present invention describes a novel integrated gas panel comprising a plurality of functional modules or building blocks. In the following description, numerous specific details, such as particular fixtures, components, and designs, have been described in detail in order to provide a thorough understanding of the present invention. It will be obvious, however, to one skilled in the art that the present invention may be practiced without these specific details. In other instances, well-known mechanical assembly, machining, and manufacturing techniques, have not been set forth in particular detail in order not to unnecessarily obscure the present invention.

Figure 1:
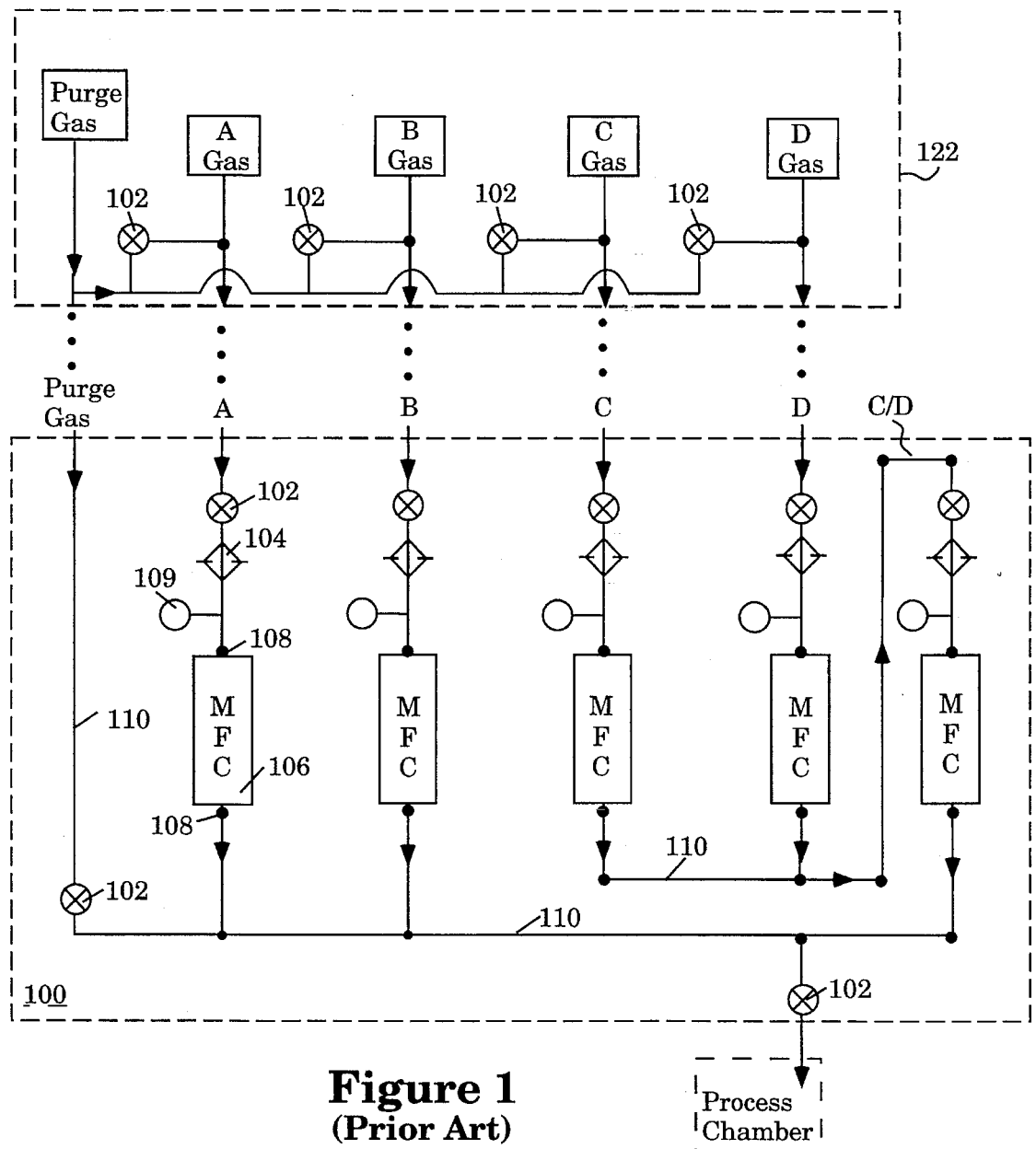
FIG. 1 is an illustration of a typical gas panel used in semiconductor processing equipment.
Figure 2:
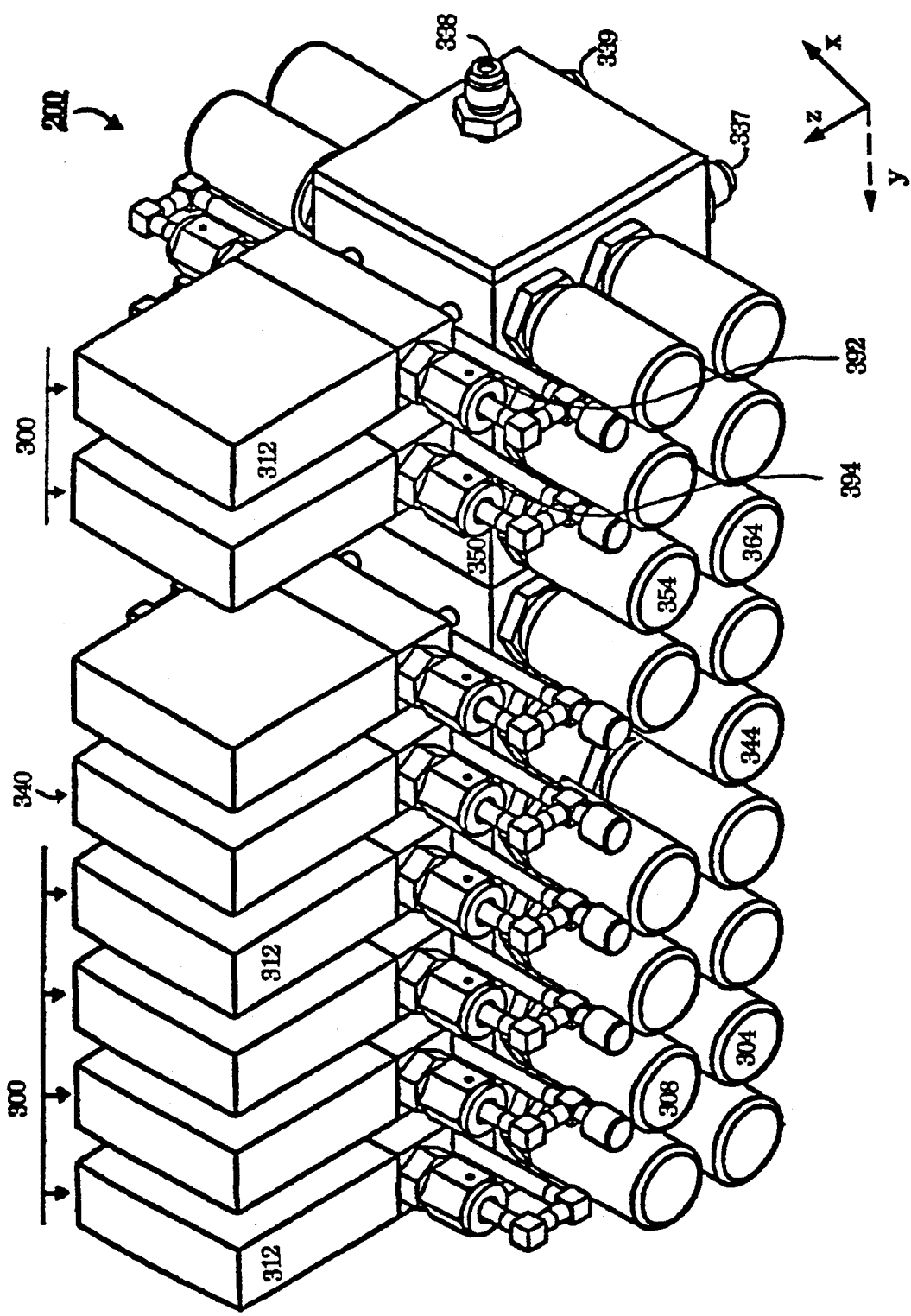
FIG. 2 is an illustration of a novel integrated gas panel of the present invention.

FIG. 2 illustrates an example of an integrated gas panel 200 of the present invention. As shown in FIG. 2, integrated gas panel 200 includes a plurality of individual modules or blocks coupled together. Each individual module integrates a plurality of passages, ports, valves, connections, and other components into a single block to provide a particular function or operation. The individual modules or blocks are serially coupled together in fluid communication to form a gas panel or gas distribution system with desired functions and capabilities. In the preferred embodiment of the present invention, integrated gas panel 200 includes process gas modules 300, an inert gas module 340, and a purge gas module 350. A process gas module 300 generally provides means for providing, controlling, and monitoring a toxic gas or gas mixture in an integrated gas panel while an inert gas module 340 is used to provide, control and monitor an inert gas or gases in the integrated gas panel. A purge gas module generally provides means for controlling the purging and evacuating of various ports and modules of the integrated gas panel.

An important feature of the present invention is that each module includes a plurality of ports or holes (not shown) extending completely through each module ("y" axis). Individual modules are coupled together so that respective ports of adjacent modules are in fluid communication with one another to form a common integrated passage (i.e., they are coupled such that gas can flow from a port in one block to the same port in an adjacent block). A gasket placed between each module either blocks or allows gas to flow between ports of adjacent blocks. By connecting modules and gaskets together in various ways, one can easily configure a variety of different gas panels capable of performing a wide variety of functions, such as mixing, premixing, purging, sampling and venting of toxic, inert, and pyrolyric gases at controlled pressures, temperatures, and flows. In integrated gas panel 200, mass flow controllers (MFCs) can be tested insitu (i.e., in place) without first removing the MFC from the gas panel. Additionally, in integrated gas panel 200, individual MFCs can be easily isolated, purged, and removed without effecting the remainder of the system.

As is readily apparent in FIG. 2, integrated gas panel 200 incorporates very little tubing. Integrated gas panel 200 has between 10–100 times less entrained volume within the system than does a similar functioning gas panel comprised of discreet components. The smaller entrained volume means less time is required to purge the system, and thus, saves on expensive machine down time normally associated with purging operations. Additionally, less entrained volume means gas panel 200 incorporates less "wetted surface area" reducing its potential as a source of contamination. Additionally, because integrated gas panel 200 has very little entrained volume, integrated gas panel 200 has superior flow control and stability compared to gas panels with long tubes and flow paths. Additionally, with smaller entrained volume less gas is required to fill and sustain the system. Thus, the integrated gas panel of the present invention utilizes less expensive gas.

The greatest advantage of integrated gas panel 200 of the present invention, however, is its modular design. A wide variety of functionally different gas panels can be easily configured by simply connecting the various modules (or obvious variations), taught in the present invention, together in different ways. With the modular design approach of the present invention, common building blocks or designs are provided on which a wide variety of functionally different gas panels can be built. The modular approach to designing a gas panel provides a standard gas panel design which makes designing, maintaining, upgrading, and manufacturing gas panels much simpler and less expensive than is presently possible.

Figure 3A:
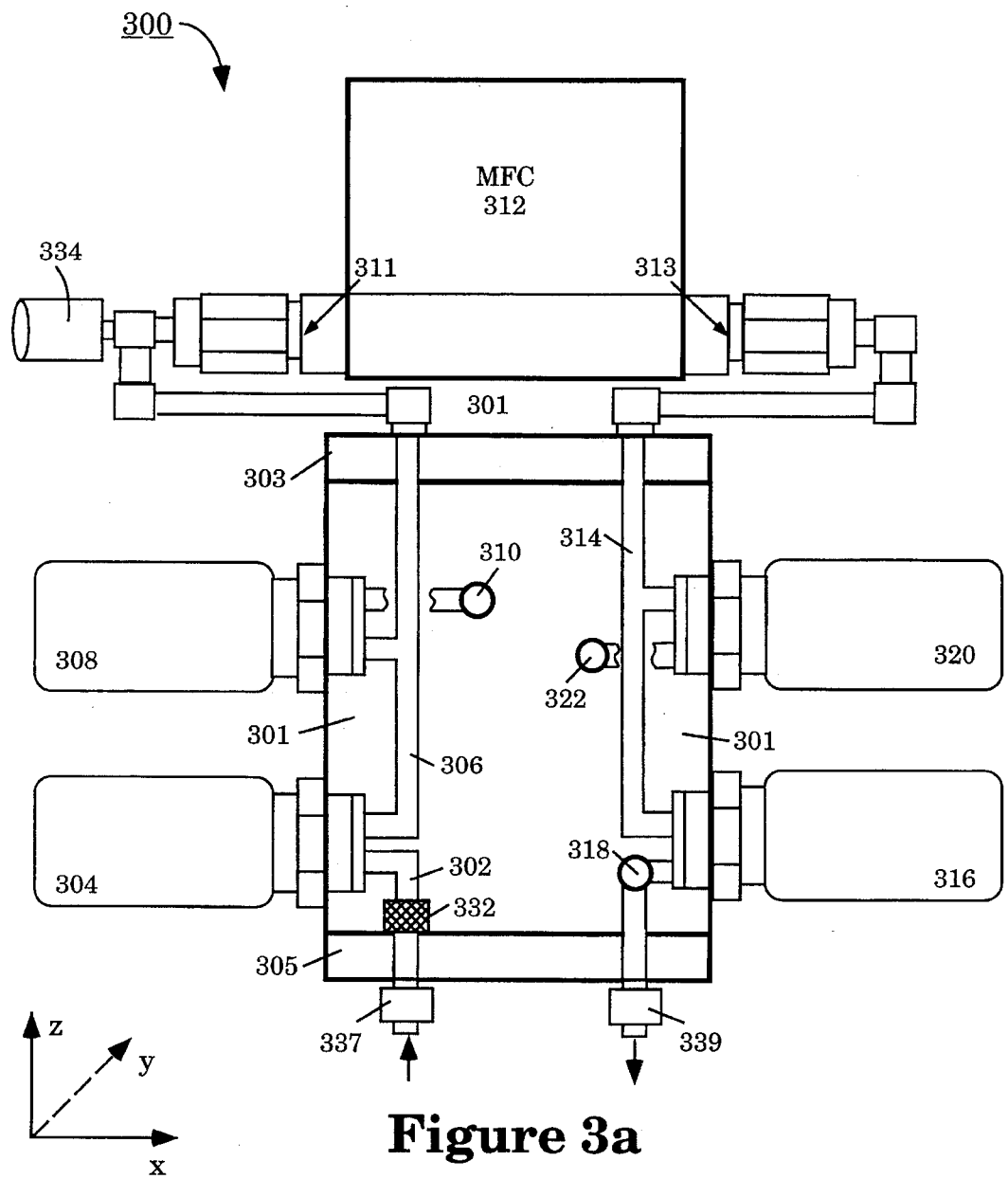
FIG. 3a is an illustration of a preferred process gas module of the integrated gas panel of the present invention.
Figure 3B:
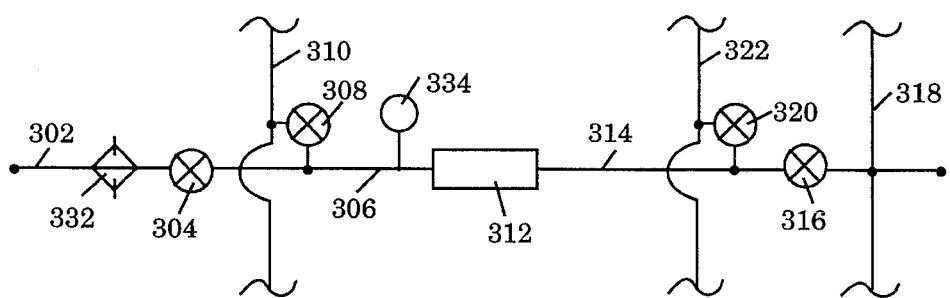

FIG. 3a is an illustration of a cut away view of a process gas module or block 300 used in integrated gas panel 200. FIG. 3b is a functional diagram of process gas module 300. Process gas module 300 is generally used to control and monitor the flow of a toxic and/or pyrolytic gas or gas mixture such as, but not limited to $BCl_3$, $SF_6$, $H_2$, or $O_2$, used in manufacturing processes, such as semiconductor fabrication processes. Generally, a single process gas module 300 is included in the integrated gas panel for each toxic process gas used in a manufacturing process tool.

As shown in FIG. 3a, process gas module 300 preferably comprises a block or manifold 301 which integrates valves, inlets, outlets, and ports into a single module. A lower plate 305 is used to couple external inlet and outlet gas lines to process gas module 300 while upper plate 303 is used to provide connections and couplings to a mass flow controller (MFC) which controls the flow of gas within process gas module 300. Upper plate 303, lower plate 305, and manifold 301 are preferably bolted together to form a single module.

As shown in FIG. 3a, in the preferred embodiment of process gas module 300, a process gas inlet 302 supplies a process gas to the integrated gas panel. An upstream isolation valve 304 is coupled between process gas inlet 302 and an MFC inlet 306. When upstream isolation valve 304 is opened, gas can flow from process gas inlet 302 to MFC inlet 306. When upstream isolation valve 304 is closed, gas is prevented from flowing between process gas inlet 302 and MFC inlet 306. An upstream purge valve 308 is coupled between MFC inlet 306 and upstream purge port 310. Upstream purge port 310 is a hole or passage which extends completely through block 301 (in the "y" direction) of process module 300. Upstream purge port 310 forms a common upstream purge passage with other modules of the integrated gas panel and provides means for purging process module 300. When upstream purge valve 308 is opened, gas can flow between upstream purge port 310 and MFC inlet 306. When upstream purge valve is closed, gas is prevented from flowing between MFC inlet 306 and upstream purge port 310.

Coupled to MFC inlet 306 is the input 311 of a Mass Flow Controller (MFC) 312 used to control the flow of gas through process module 300. Coupled to the output 313 of MFC 312 is an MFC outlet 314. A mix isolation valve 316 is coupled between MFC outlet 314 and a mix port 318. Mix port 318 is a hole or passage which extends completely through manifold housing 301 (in the "y" direction) of process gas module 300. When mix isolation valve 316 is open, gas can flow between MFC outlet 314 and mix port 318. When mix isolation valve 316 is closed, gas is prevented from flowing between MFC outlet 314 and mix port 318. Mix port 318 forms a common mix passage with other modules of the gas panel and provides a passage where gases are mixed together to form a gas mix.

Although not necessarily required, the preferred embodiment of process gas module 300 includes a purge divert port 322 and a purge divert valve 320. Downstream purge valve 320 is coupled between MFC outlet 314 and purge divert port 322. Purge divert port 322 is a hole or passage which extends completely through manifold or housing 301 of process gas module 300. When purge divert valve 320 is open, gas can flow between MFC outlet 314 and purge divert port 322. When purge divert valve 320 is closed, gas is prevented from flowing between MFC outlet 314 and purge divert port 322. Purge divert port 322 provides an alternative flow path to divert gases in the integrated gas panel of the present invention.

Although not necessarily required, housing 301 of process gas module 300 also includes a filter 332 serially coupled to process gas inlet 302. Filter 302 is used to clean or filter the process gas before it flows through the remainder of the gas system. Additionally, a pressure transducer 334 is preferably coupled by a "Tee" connection to the external tubing used to couple MFC 312 to MFC inlet 306. Pressure transducer 334 is used to measure gas pressure in process gas module 300.

Lower plate 305 includes exterior connections 337 and 339 for connecting gas input and output lines, respectively, to process gas module 300. Gaskets are preferably placed between lower plate 305 and manifold 301 and between upper plate 303 and manifold 301 in order to provide an air tight seal between them. If no external connection is to be made to exterior outlet connection 339, the gasket can be used to seal off gas flow between gas connection 339 and port 318. Upper and lower plate 303 and 305 are preferably stainless steel plates.

Figure 3C:
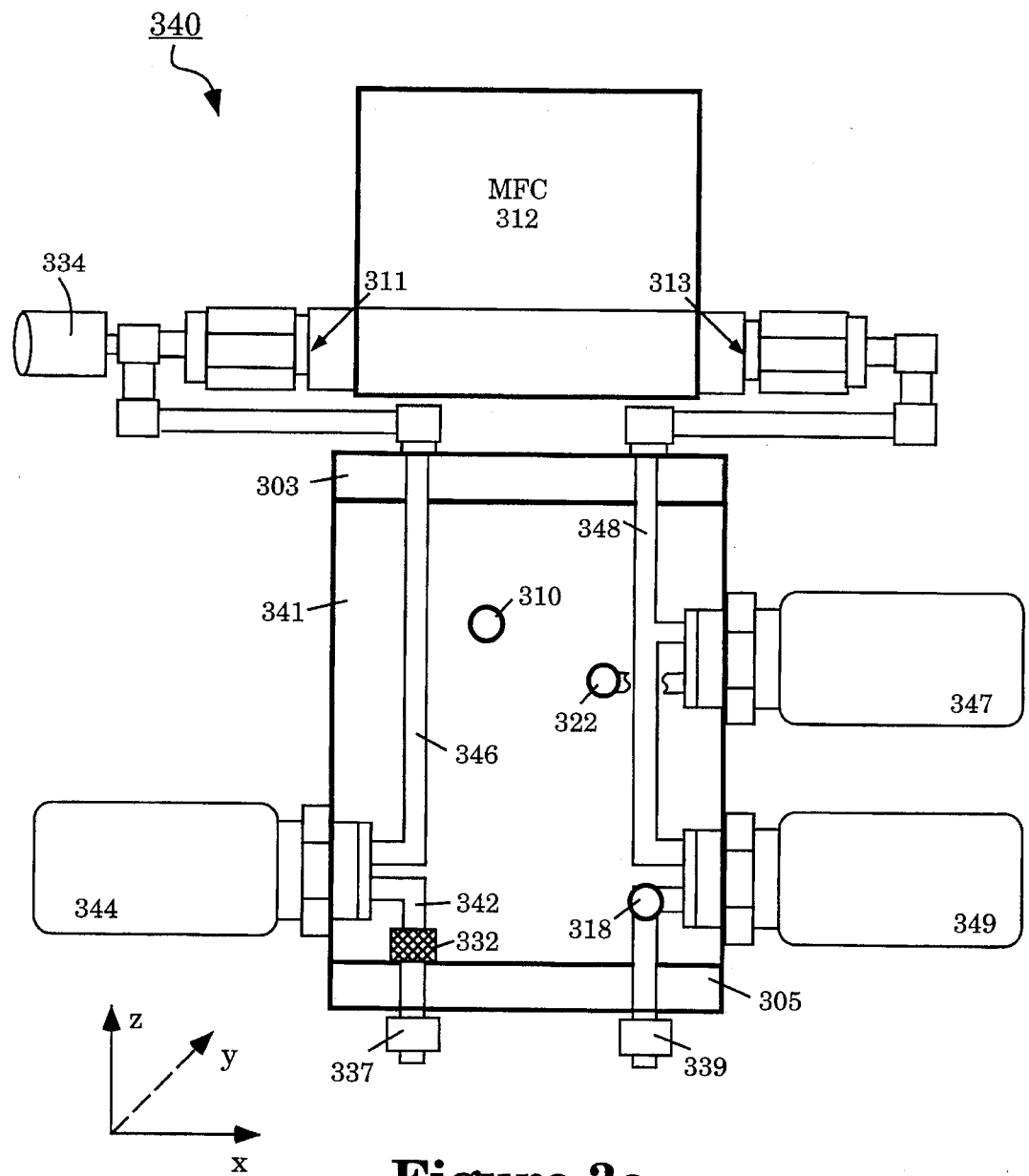
FIG. 3c is an illustration of a preferred inert gas module of the integrated gas panel of the present invention.
Figure 3D:
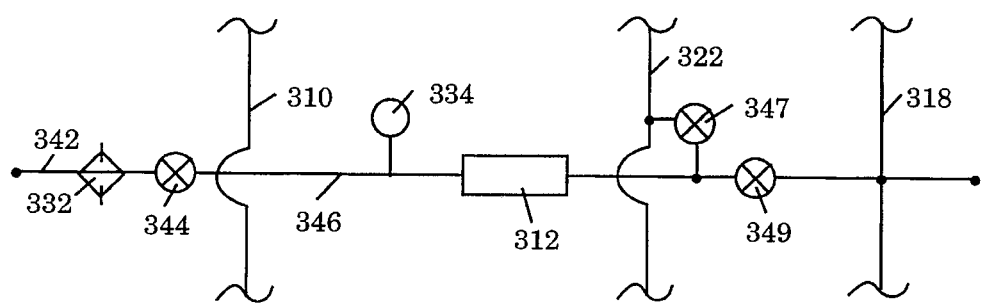
FIG. 3d is a functional diagram of inert gas module shown in FIG. 3c.

Shown in FIG. 3c is an inert gas module 340 comprising a two-valve block or manifold 341. FIG. 3d is a functional diagram of inert gas module 340. Inert gas module 340 is generally used to monitor and control the flow of an inert gas, such as but not limited to He and Ar, used in semiconductor manufacturing processes. Generally, a single process gas module 340 is included in integrated gas panel 200 for each inert gas used in a manufacturing process. Like process gas module 300, inert gas module 340 includes a top plate 303 and a bottom plate 305 for providing connections to an MFC and external gas lines, respectively. Additionally, like manifold 301, manifold 341 integrates inlets, outlets, valves, and ports into a single module.

An inert gas inlet 342 is provided for supplying an inert gas to integrated gas panel 200. An upstream isolation valve 344 is coupled between inert gas inlet 342 and MFC inlet 346. When upstream isolation valve 344 is open, gas can flow between inert gas inlet 342 and MFC inlet 346. When upstream isolation valve 344 is closed, gas is prevented from flowing between inert gas inlet 342 and MFC inlet 346.

Coupled to MFC inlet 346 is the input 311 of a Mass Flow Controller (MFC) 312 used to control the flow of gas through inert gas module 340. Coupled to the output 313 of MFC 312 is an MFC outlet 348. A mix isolation valve 349 is coupled between MFC outlet 348 and mix port 318.

Manifold 341 also includes a upstream purge port 310 and a purge divert port 322. No couplings are required between the purge ports and the inlets and outlets of inert gas module 340 because inert gas module 340 is used to handle only safe inert gases which need not be purged. A purge divert valve 347, however, is preferably coupled between purge divert port 322 and MFC outlet 348 in order to provide divert venting capabilities. It is to be appreciated that upstream purge port 310, purge divert port 322, and mix port 318 of process gas module 340 are located in the same place as they are in process gas module 300 so that when process gas module 300 and inert gas module 340 are coupled together, a common passage or tube is formed at each port. It is also to be appreciated that inert gas module 340 has inlets and outlets positioned similarly to those of process gas module 300. This makes manufacturing manifolds 301 and 341 simpler. Additionally, it is to be appreciated that one could use manifold 301 in inert gas module 340 by simply sealing off locations for upstream purge valve 308 and purge divert valve 320.

Figure 3E:
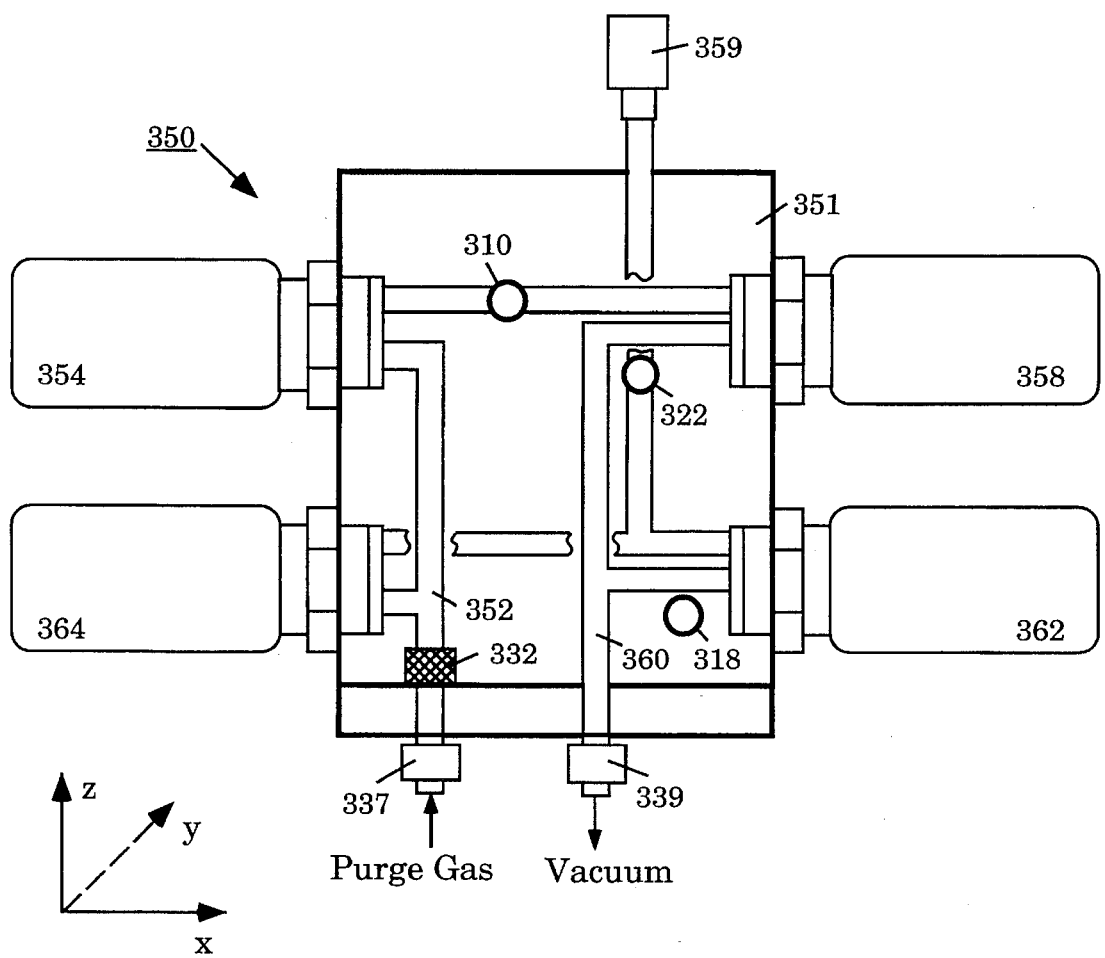
FIG. 3e is an illustration of a preferred purge gas module of the integrated gas panel of the present invention.
Figure 3F:
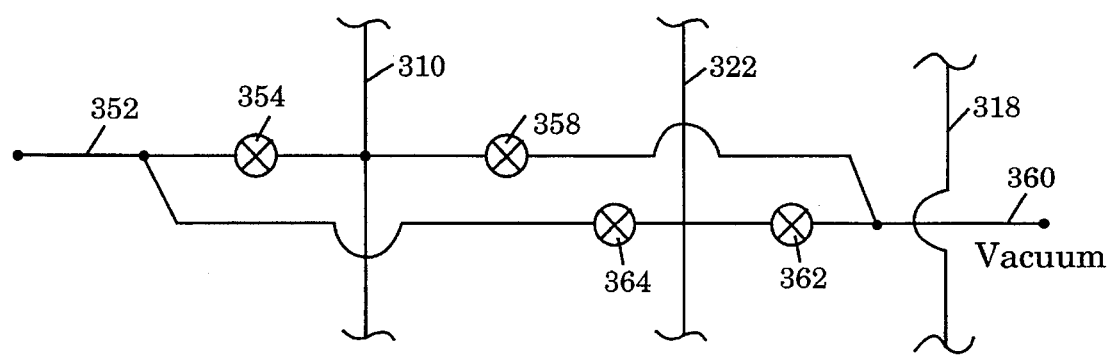
FIG. 3f is a functional diagram of the purge gas module shown in FIG. 3e.

FIG. 3e is an illustration of a cutaway view of a purge gas module or block 350. FIG. 3f is a functional illustration of purge gas module 350. Purge gas module 350 is generally used to initiate and control the purging of integrated gas panel 200. Purge gas module 350 generally purges integrated gas panel 200 or a module of integrated gas panel 200 by flowing an inert gas, such as $N_2$, into upstream purge port 310 and by coupling purge divert port 322 to a vacuum. Integrated gas panel 200 can also be purged by flowing a purge gas into purge divert port 322 and out upstream purge port 310 to vacuum. Purge gas module 350 also provides the ability to "cycle purge" integrated gas panel 200.

As shown in FIG. 3e, purge gas module 350 includes a purge gas inlet 352 formed in manifold or housing 351. Purge gas inlet 352 is coupled to a source of an inert gas, such as $N_2$. An upstream isolation valve 354 is coupled between purge gas inlet 352 and upstream purge port 310. When upstream isolation valve 354 is open, gas can flow between purge gas inlet 352 and upstream purge port 310. When upstream isolation valve 354 is closed, gas is prevented from flowing between purge gas inlet 352 and upstream purge port 310. An upstream vacuum valve 358 is coupled between upstream purge port 310 and a purge gas outlet 360 which is generally coupled to a vacuum. When upstream vacuum valve 358 is open, gas can flow between upstream purge port 310 and purge gas outlet 360. When upstream vacuum valve 358 is closed, gas is prevented from flowing between upstream purge port 310 and purge gas outlet 360.

A downstream vacuum valve 362 is coupled between purge gas outlet 360 and purge divert port 322. When purge divert valve 362 is open, gas can flow between purge divert port 322 and purge divert gas outlet 360. When purge divert valve 362 is closed, gas is prevented from flowing between purge divert port 322 and purge divert gas outlet 360.

A downstream isolation valve 364 is preferably coupled between purge gas inlet 352 and purge divert port 322. When downstream isolation valve 364 is open, gas can flow between purge divert port 322 and purge gas inlet 352. When downstream isolation valve 364 is closed, gas is prevented from flowing between purge divert port 322 and purge gas inlet 352. Additionally, a pressure transducer 359 is preferably coupled to purge divert port 322.

Although the preferred embodiment of purge gas module 350 of the present invention utilizes two ports 310 and 322 and four valves 364, 354, 358, and 362 all that is necessary to provide purging capabilities is a single port which is coupled by one valve to a purge gas source and which is coupled by a second valve to an exhaust source such as a vacuum.

In the preferred embodiment of the present invention, process gas module 300, inert gas module 340 and purge gas module 350 each preferably comprise a single housing or manifold 301, 341, and 351, respectively. Manifolds 301, 341, and 351 are preferably each a single solid stainless steel block containing 0.18 inch drilled passages which provide the inlets, outlets, and couplings to ports. The ports are also 0.18 inch drilled passages which extend completely through the block. It is to be appreciated that according to the preferred embodiment of the present invention, the inlets, outlets, and couplings to ports are generally formed in the "x-z" plane while ports are formed in the "y" direction perpendicular to the inlets, outlets, and port couplings. Additionally, according to the preferred embodiment of the present invention, all "wetted surfaces" or gas exposed surfaces are electropolished to prevent corrosion and to provide an ultra clean environment. In the preferred embodiment of the present invention housings 301, 341, and 351 have a compact design (i.e. approximately 4" (x)·4" (z)·1.5" (y)) which saves valuable space and which provides a gas panel with very little entrained volume.

Additionally, according to the preferred embodiment of the present invention, all valves are preferably vacuum tight valves with valve seals which are able to withstand gas pressures of at least 200 psi and gas temperatures ranging from 0°–70° C. The preferred embodiment of the present invention utilizes pneumatically switched valves which allow for automatic or computer control of integrated gas panel 200, however, manually switched valves may be used if desired. It is to be appreciated that any well-known valve which can provide an adequate airtight seal, such as diaphragm valves manufactured by A. P. Technology, Nupro Company, Veriflow Corporation, and Fujikin, can be utilized in the present invention. Additionally, according to the preferred embodiment of the present invention, gas modules 300, 340, and 350 are coupled externally by well-known airtight metal seal connections 337 and 339 to external gas lines. Any well-known connection can be used for external connection, such as a VCR connection manufactured by Cajon. Additionally, ultra clean stainless steel tubing is used in the few places of integrated gas panel 200 which require tube routing.

An important feature of the present invention is that each module includes all the same ports, for mixing, purging, and diverting, etc., as all other modules. It is to be appreciated that additional ports, such as ports for venting gases and sampling gases can also be provided in each module, if desired. The ports are physically located such that when modules are connected together, the ports of adjacent modules are aligned to form a common tube or passage. By placing gaskets between adjacent blocks, gas is either allowed to flow or is prevented from flowing between ports of adjacent blocks.

Figure 3G:
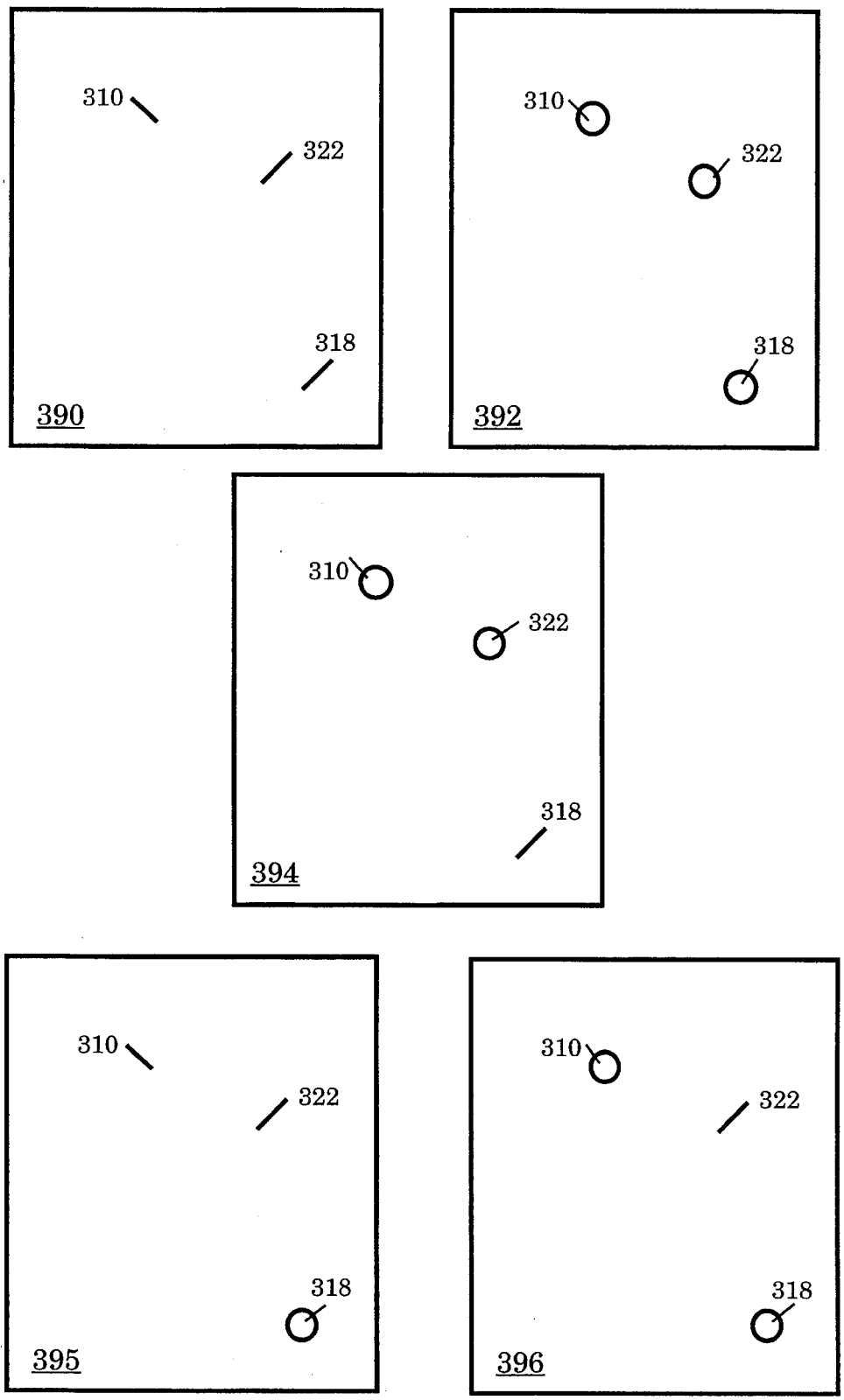
FIG. 3g is an illustration of a plurality of gaskets used in the integrated gas panel of the present invention.

FIG. 3g shows five different gaskets used in the preferred embodiment of the present invention. The first gasket is a blind end gasket 390. Blind end gasket 390 blocks all ports (i.e., has no openings or flow paths for any of the ports 310, 318, and 322). Blind end gasket 390 is ideally suited for use as the outermost gasket for a module located at the end of integrated gas panel 200. A second gasket 392 is a mix gasket. Mix gasket 392 has an opening for each port 310, 318, and 322, included in gas module 300, 340, and 350. An opening in mix gasket 392 for mix port 318 allows the process gas of adjacent modules to be mixed together to form a mixed gas. A third gasket is a mix segregation gasket 394. Mix segregation gasket 394 has an opening for upstream purge port 310 and purge divert port 322. There is, however, no opening for mix port 318. Mix segregation gasket 394 prevents process gases from adjacent blocks from mixing together in mix port 318. A fourth gasket is a mix gasket with blind purge and divert ports 395. Gasket 395 allows gas to flow in mix port 318, but prevents gas from flowing in upstream purge port 310 and purge divert port 322. A fifth gasket is a mix gasket with a blind purge divert port 396. Gasket 396 allows gas to flow in upstream purge port 310 and mix port 318 but prevents gas flow in purge divert port 322.

It is to be appreciated that the gaskets shown in FIG. 3g are only a representative example, and that other gaskets can be easily designed to prevent and allow flow of gas between ports of adjacent blocks in any manner desired, in order to achieve different routing and functional outputs. For example, different gaskets would be required if additional or different ports were included in the gas modules of the present invention. The gaskets in the preferred embodiment of the present invention are thin sheets (between 0.025–0.030 inches thick) of stamped or drilled stainless steel or nickel. Other materials, however, which are strong enough to prevent gas flow, can be used if desired. Additionally, although gaskets are the preferred method of controlling the flow of gas between ports of adjacent modules, other well-known means, such as plugs and "o" rings, may be used if desired.

Figure 4:
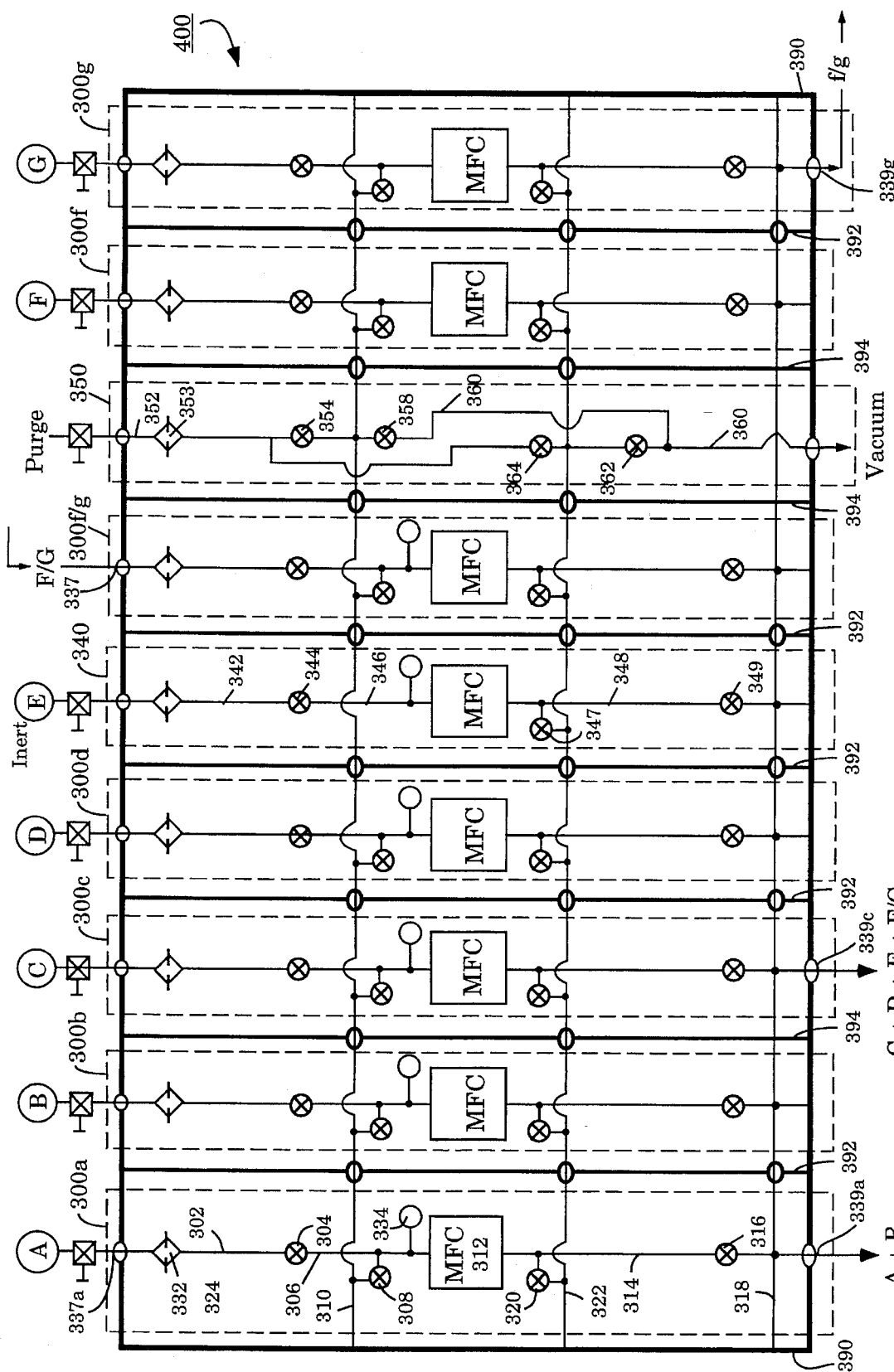
FIG. 4 is an illustration of functional diagram of a novel integrated gas panel of the present invention.

FIG. 4 is an illustration of a functional diagram of an exemplary integrated gas panel 400 of the present invention. FIG. 4 shows how a plurality of process gas modules 300, an inert gas module 340, a purge gas module 350, and a plurality of gaskets can be connected together to generate a gas panel with mixing, premixing, and diverting capabilities.

As shown in FIG. 4, a process gas module 300 is provided for each toxic or pyrolytic gas, as well as one for each premix gas, used in a manufacturing process or in a piece of manufacturing equipment. A source, such as a tank or bottle, of each process gas is coupled through a regulator to the external connection 337 of each process gas inlet of each process gas module 300. A single purge gas module 350 is provided to control the purging of integrated gas panel 400. A source of an inert purge gas, such as $N_2$, is coupled to purge gas inlet 352 and a vacuum or exhaust source is coupled to purge gas outlet 360 of purge gas module 350. Additionally an inert gas module 340 is provided in the integrated panel. A source of inert gas (E), such as He or Argon, is coupled to the external connection 337 made to inert gas inlet 342.

As shown in FIG. 4, a blind end gasket 390 is coupled to the exterior face of the end process gas module 300a and to exterior face of end process gas module 300g. Blind end gaskets 390 seal off or close off the ends of mix port 318, upstream purge port 322, and purge divert port 318, so that no gas can escape. Front and back stainless steel end plates are preferably coupled to blind end gaskets 390 to give integrated gas panel 400 structural integrity. Either a mix gasket 392 or a mix segregation gasket 394 is coupled between each of the interior process gas modules 300, inert gas module 340, and purge gas module 350. Since mix gasket 392 and mix segregation gasket 394 each provide openings for upstream purge port 310 and purge divert port 322, common upstream and purge divert ports or passages are formed within integrated gas panel 400, which extends the entire length of integrated gas panel 400 without interruption. A common mix port or tube is also formed within integrated gas panel 400. Common mix port 318, however, is segregated at desired places by mix segregation gaskets 394 to define a plurality of discreet mixing segments.

For example, process gas module 300a and 300b have a mix gasket 392 coupled between them. Mix gasket 392 allows gas to flow between all respective ports of process module 300a and 300b, including mix port 318. Since mix port 318a and mix port 318b are in fluid communication, gas A and gas B are mixed together. A mix segregation gasket 394 is coupled between process gas modules 300b and 300c.

Mix segregation gasket 394 prevents gas from flowing between process gas modules 300b and 300c in mix port 318. As such, only gases A and B from process gas modules 300a and 300b are mixed together. The A/B mix flows out of exterior outlet connection 339a in process gas module 300a, while exterior outlet connection 339b in process gas module 300b is sealed off. Typically exterior outlet connection 339 is coupled to a feedline of a piece of manufacturing equipment or a process tool which utilizes gas mixture A/B.

Also shown in FIG. 4 is a method of premixing gases in integrated gas panel 400. Process gas module 300f and 300g are coupled together by a mix gasket 392 which allows fluid communication between mix port 318f and 318g. A mix segregation gasket 394 coupled between purge module 350 and process gas module 300f defines a mix segment between process gas module 300f and 300g. As such, process gases F and G are mixed together in mix port 318 and the F/G mix is outputted from exterior outlet connection 339g, while connection 339f is sealed off. As shown in FIG. 4, the F/G mix is outputted from exterior outlet connection 339g to exterior inlet connection 337 of process gas inlet 302f/g of process gas module 300f/g. Because the F/G mix is routed to the inlet of another process gas module (300f/g) which controls the flow rate of the mix, process gas modules 300f and 300g can be referred to as "premix" process gas modules.

FIG. 4 also shows how a plurality of gases C, D, and E can be mixed together with a premixed gas (F/G) or form an additional or second level mix. For example, in FIG. 4 a mix gasket 392 is coupled between process modules 300c and 300d, between process gas modules 300d and 300e, and between inert gas modules 340 and process gas module 300f/g. Additionally, a mix segregation gasket 394 is coupled between process gas module 300b and 300c and between process gas module 300f/g and purge gas module 350 to prevent other gases from mixing with gases C, D, E, and F/G. As such, process gases C, D, E, and mix F/G are coupled together in mix port 318 and outputted from connection 339c of process gas module 300c to a feedline of a piece of manufacturing equipment which utilizes the second level C+D+E+F/G gas mixture.

In the preferred embodiment of the present invention, the individual modules and gaskets are bolted together as a single group to form an integrated gas panel. The modules are preferably bolted together at each corner and in the center of the modules. Although bolting is the preferred method of connecting modules and gaskets, other well-known techniques, such as welding, screwing, or clamping, may be used if desired. What is important is to securely fasten the modules together to insure that no gas can escape from port connections between adjacent modules.

Additionally, it is to be noted, as shown on FIG. 2, that an exterior connection 338 can be easily made to any of the ports, if desired. An opening would be provided in end gasket 390 and an external connection 338 provided on the end plate. External connection 338 can be used for example, as a means to sample a process gas for impurities. In such a situation, a process gas could be diverted into purge divert port 322 where a gas analyzer coupled to external connection 338 made to purge divert port 322 could check the quality of gas. Providing a lateral connection to the ports increases the versatility to the integrated gas panel of the present invention.

Typical operational modes of integrated gas panel 400 will now be explained with respect to FIGS. 3a, 3c, 3e, and FIG. 4. In the normal mode of operation integrated gas panel 400, upstream isolation valve 304 and mix isolation valve 316 of all process gas modules 300 are open while all upstream purge valves 308 and all purge divert valves 320 of all process gas modules 300 are closed. Additionally, inert gas isolation valve 344 and mix valve 349 of process gas module 340 are also open. In this way can gas flow into each gas inlet, through the filter 332, through the upstream isolation valve, and out the MFC inlet to the MFC which is used to control the flow rate of gas in the module. Gas then flows out from the MFC into the MFC outlet, through the mix isolation valve and into the mix port where the gas is mixed with other gases from adjacent modules which are not segregated by a gasket. The mix is then outputted to a process tool feedline from one of the exterior outlet connections 339 making up the mix segment. Additionally, during normal mode of operation of integrated gas panel 400, all valves of purge gas module 350 are closed.

In order to remove a single MFC, say MFC 312d, from integrated gas panel 200, the MFC must be first isolated and then purged to insure that no toxins escape into the atmosphere. In a first preferred purge mode of purge gas module 350, upstream isolation valve 354 and downstream vacuum valve 362 are opened, and upstream vacuum valve 358 and downstream isolation valve 364 are closed. Next, process gas module 300d is placed in a purge mode. First, isolation valves 304d and 316d are closed to isolate MFC 312d from the remainder of the gas system, and then once MFC 312d is completely isolated, upstream and purge divert valves 308 and 320 are opened with purge divert valve 320 opening slightly before upstream purge valve 308 in order to create a back pressure.

An inert gas, such as $N_2$, then flows into purge gas inlet 352, through filter 353, through upstream isolation valve 354, and into upstream purge port 310. The inert gas then flows through the common upstream purge path 310 formed by process gas modules 300f/g and inert gas module 340 to upstream purge port 310d. The inert gas then flows through upstream purge valve 308 to MFC inlet 306d, into and through MFC 312d, and then out through MFC outlet 314d, through purge divert valve 320d, and then out purge divert port 322d. The inert purge gas then flows through the common purge divert ports of process and inert gas modules 300f/g and 340 to purge divert port 322 of purge gas module 350. The inert gas then travels through purge divert valve 362 to purge gas outlet 360 where it is exhausted away by a vacuum.

Purging is continued in this manner until all toxins and/or contaminates are removed to the desired level. It is to be appreciated that purging an MFC in integrated gas panel 200 requires very little time and effort because integrated gas panel 200 has extremely short purge passages and has the ability to locally isolate and purge MFCs. With integrated gas panel 400 of the present invention, an MFC can be easily purged and replaced without effecting other components of the gas system to which it is coupled or requiring excessive equipment downtime.

It is to be appreciated that, if desired, one can purge gas panel 400 by flowing an inert gas into purge divert port 322 and out upstream purge port 310. This can be accomplished by placing purge gas module 350 in a second purge mode where valves 364 and 358 are opened and valves 354 and 362 are closed.

Additionally, if desired, an MFC can be quickly and efficiently decontaminated by cycle purging. In a cycle purge operation, the process gas module 300 to be cycle purged is first placed in the purge mode (i.e., isolation valves 304 and 316 are closed and purge valves 308 and 320 are opened). Next, purge gas module 350 is placed in a first state of a cycle purge mode where isolation valves 354 and 364 are both opened and vacuum valves 358 and 362 are both closed. An inert gas is then flowed through purge ports 310 and 322 to slightly pressurize the MFC to be purged. Next, purge gas module 350 is placed in a second state of the cycle purge mode where isolation valves 354 and 364 are closed and vacuum valves 358 and 362 are open to evacuate the inert gas from purge ports 310 and 322 and the MFC. Next, purge gas module 350 is switched back to the first state of the cycle purge mode to once again fill purge ports 310 and 322 and MFC 312 with inert gas. Additional cycles of evacuating and backfilling are continued in this manner until a desired level of cleanliness is achieved. Cycle purging is an efficient and effective method of decontaminating or purging integrated gas panel 400 or specific modules contained therein in the event that gas cannot flow through MFC 312 efficiently. Additionally, to effectively remove moisture from integrated gas panel 400 it is suggested to heat the inert purge gas prior to purging.

It is to be noted that two or more process gas modules 300 can be simultaneously purged, if desired. This can be accomplished by placing all process gas modules to be simultaneously purged into a purge mode (i.e., by first closing upstream and downstream isolation valves 304 and 316, respectively, and by opening upstream and purge divert valves 308 and 320). Additionally, it is to be appreciated that one module or a group of modules can be in an operational mode, while another module or group of modules is being purged. For example, a process tool may receive and utilize a first mix C+D+E+F/G, while process modules 300a and 300b of a second mix A+B are being purged.

It is to be noted that if a purge divert port and a downstream isolation valve are not included in the integrated gas panel, toxic and contaminated purge gas can be exhausted through the mix ports of the process gas modules, which would be coupled to an exhaust.

A valuable feature of the integrated gas panel of the present invention, it that an MFC can be tested in place (i.e., insitu tested). In order to insitu test an MFC, purge gas module 350 is first switched to the first purge mode and then the process gas module 300 which contains the MFC to be tested is placed in the purge mode. This effectively isolates the MFC from process gas lines and couples the input and output of the MFC to upstream purge and purge divert ports 310 and 322, respectively. Next, a flow of test gas (typically $N_2$) is monitored by a good or proven mass flow meter (MFM) as it flows into purge gas inlet 352, through upstream purge port 310, and through the MFC to be tested. The accuracy of the tested MFM can be determined by comparing its readings with those of the proven MFM. Integrated gas panel 400 of the present invention allows an MFC to be quickly and easily tested in place without effecting other portions of the gas panel. If after the test it is determined that the MFC has failed or is unreliable, the MFC is removed and replaced.

In order to remove an MFC, according to the preferred embodiment of the present invention, purge gas module 350 is placed in a removal mode where upstream and downstream isolation valves 354 and 364 are both opened and vacuum valves 358 and 362 are both closed. The process gas module 300 which contains the MFC which is to be removed is placed in the purge mode. In this way inert gas flows from purge gas inlet 352 simultaneously into both upstream purge port 310 and purge divert 322 and into both MFC inlet 306 and MFC outlet 314 of the process gas module which contains the MFC to be removed. The MFC can then be removed from process gas module 300. Because inert gas flows out both MFC inlet 306 and MFC outlet 314 when MFC 312 is removed, no contaminates or moistures can seep into process gas module 300 or integrated gas panel 400 while the MFC is removed. Once a new MFC is securely connected into process gas module 300, it is decontaminated by purging with one of the techniques described above.

Prior to resuming normal operation of process gas module 300 it is advisable to first vent off some process gas from the process gas module 300 to which the new MFC is connected. This process is also useful when the mix ratios of gases are to be changed. Venting off process gas stabilizes the gas flow rate through MFC 312, which otherwise would be initially characterized by large fluctuations in flow rate. In order to vent off process gas from process gas module 300, upstream isolation valve 304 is opened, mix isolation valve 316 is closed, and purge divert valve 320 is opened. Additionally, downstream vacuum valve 362 of purge gas module 350 is opened. In this way, process gas flows through MFC 312 of process gas module 300, and is diverted through purge divert port 322, where it is evacuated away by a vacuum through purge gas module 350. Once the flow of gas through MFC 312 is sufficiently stable, purge divert valve 320 of process gas module 300 is closed and mix isolation valve 316 is opened to resume normal operation.

Figure 5A:
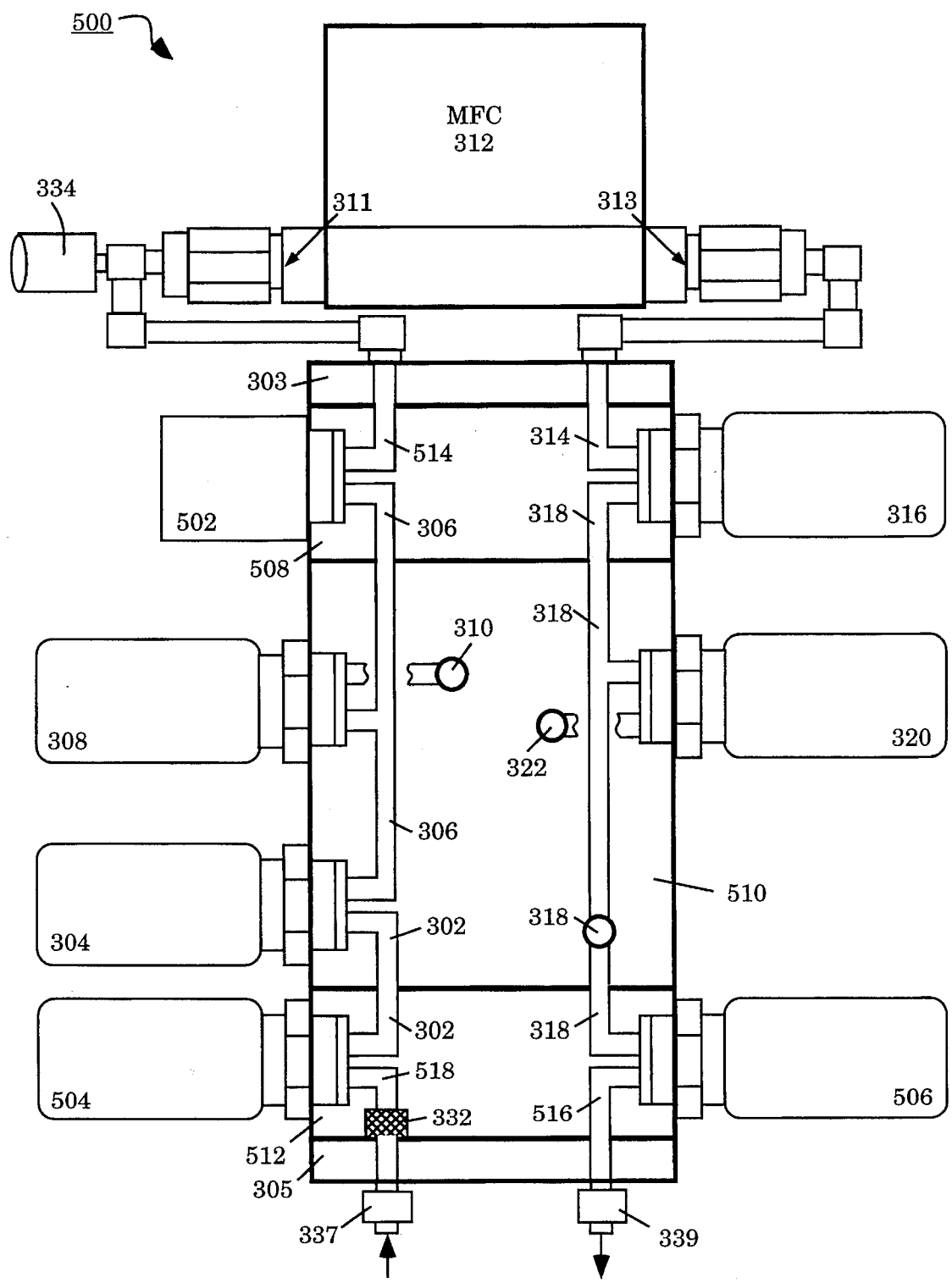
FIG. 5a is an illustration of a preferred three block process gas module of the present invention.

At times it may be desirable to include additional features and capabilities, such as regulators and additional valves, into the integrated gas panel 400 of the present invention. When additional features are desired, according to the present invention, one can simply bolt an additional block onto the top and/or bottom of manifolds 301, 341, and 351. For example, shown in FIG. 5a, is a process gas module 500 which further includes a pressure regulator 502, a lock-out-tag-out isolation valve 504, and a chamber isolation valve 506. Process gas module 500 also includes a purge divert port 322 located downstream of mix isolation valve 318.

As shown in FIG. 5a, a process gas module 500 includes a top block 508, a manifold block 510, and a bottom block 512, as well as a top plate 303 and a bottom plate 305. Top block 508 contains an MFC inlet passage 306 and a mix port passage 318 which align to MFC inlet passage 306 and mix port passage 318, respectively, of manifold block 510. In a similar manner, bottom block 512 contains a process gas inlet 302 and a mix port passage 318 which align to process gas inlet 302 and mix port passage 318, respectively, of manifold block 510. Ideally, top block 508 and bottom block 512 contain the identical passages so that a single block can be utilized in both locations. A gasket is preferably placed between top block 508 and manifold block 510 and between bottom block 512 and manifold block 510 in order to achieve a strong air tight seal between blocks.

Located in top block 508 is a pressure regulator 502. Pressure regulator 502 is coupled between MFC inlet 306 and regulated MFC inlet 514, which in turn is coupled to MFC input 311. Pressure regulator 502 regulates and controls the pressure of gas within process gas module 500. That is, pressure regulator 502 is used to reduce the pressure of the gas inputted into the process gas module to a pressure used in the manufacturing process. Pressure regulator 502 is ideally located upstream and as close as possible to MFC 312 in order to provide superior gas flow control. Also located in top block 508 is mix isolation valve 316.

Located in manifold 510 is a purge divert valve 320. Purge divert valve 320 is coupled between mix port 318 and the purge divert port 322. When purge divert valve 320 is open, gas can flow between mix port 318 and purge divert port 322, and when purge divert valve 320 is closed, gas is prevented from flowing between mix port 318 and purge divert port 322. Purge divert valve 320 and purge divert port 322 in process gas module 500 differ from purge divert valve 320 and purge divert port 322 in process gas module 300 in that in process gas module 500 they are located downstream of mix isolation valve 316.

Located in bottom block 512 is a chamber isolation valve 506. Chamber isolation valve 506 is coupled between mix port 318 and chamber feedline 516. When chamber isolation valve 506 is open, gas can flow between mix port 318 and chamber feedline 516, and when chamber isolation valve 506 is closed, gas is prevented from flowing between mix port 318 and chamber feed line 516. A chamber isolation valve 506 is typically used in a process gas module which feeds a gas or a gas mix to a process chamber. Chamber isolation valve provides a means to isolate a gas or gas mix from the chamber to which it is coupled.

Also located in bottom block 512 is a lock-out-tag-out (LOTO) valve 504. LOTO valve 504 is located between process gas inlet 302 and a bottle/source inlet 518. When LOTO valve 504 is open, gas can flow between process gas inlet 302 and bottle/source inlet 518, and when LOTO valve 504 is closed, gas is prevented from flowing between process gas inlet 302 and bottle/source inlet 518. LOTO valve 504 is included to increase the safety of the integrated gas panel. For example, when maintenance of the integrated gas panel is desired, LOTO valve 504 is closed and mechanically locked in place so that it can not be opened. A tag is then placed on the valve to inform personnel not to open the valve unless certain conditions are satisfied. In this way, no toxic gas from the gas source can be accidentally released into the atmosphere through, for example, a removed MFC while maintenance is taking place. Also located in bottom block 512 is filter 332 which is coupled to bottle/source inlet 518.

Manifold block 510 preferably includes essentially the same inlet and outlet routing, as well as port locations, as block 301 of process gas module 300 in order to simplify manufacturing and reduce costs. In fact, block 301 can be used as manifold block 510 by simply sealing off the location of mix isolation valve 316.

Although process gas module 500 can be manufactured from a single block, it is preferably manufactured from multiple blocks, in order to increase the versatility of the individual blocks. In this way, when additional features or capabilities are desired, one can simply bolt an additional block or blocks onto manifold block 510. Additionally, although ports can be included in top and bottom blocks 508 and 512, respectively, it is preferable not to include ports in these blocks because it is difficult to achieve strong air tight seals between inlets and outlets in one direction and ports in the other direction.

Figure 5B:
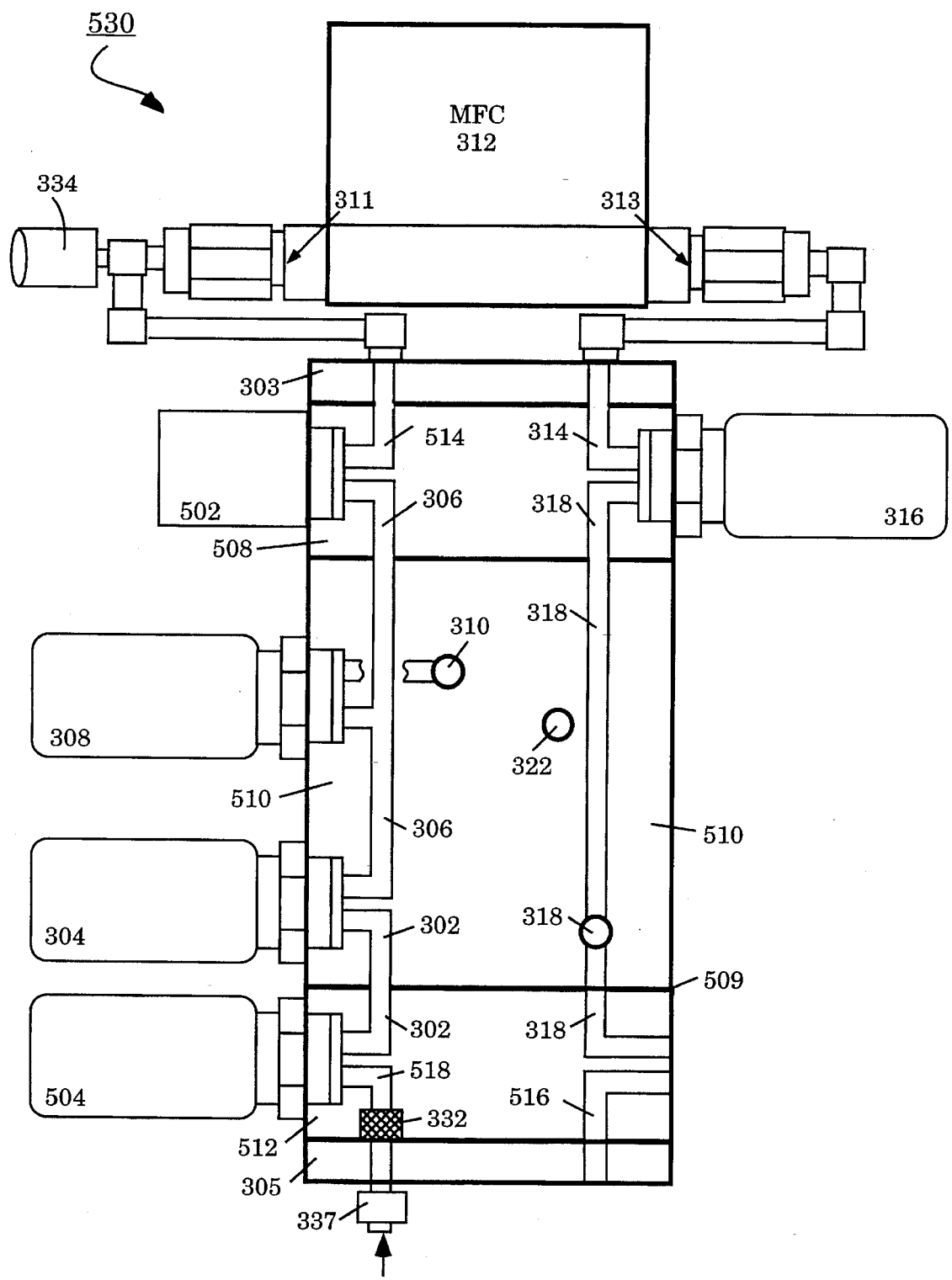
FIG. 5b is an illustration of a preferred three block inert gas module of the present invention.

Shown in FIG. 5b is a process gas module 530. Process gas module 530 is similar to process gas module 500, shown in FIG. 5a, except that there is no chamber isolation valve 506 in lower block 512. A gasket 509 is used to prevent gas from flowing between mix port 318 in manifold 510, to mix passage 318 in lower block 512. Additionally, in process gas module 530 a purge divert valve 320 is not necessary and this is not included. Process module 530 is typically used in a mix with another process gas module which contains a chamber isolation valve 506.

Figure 5C:
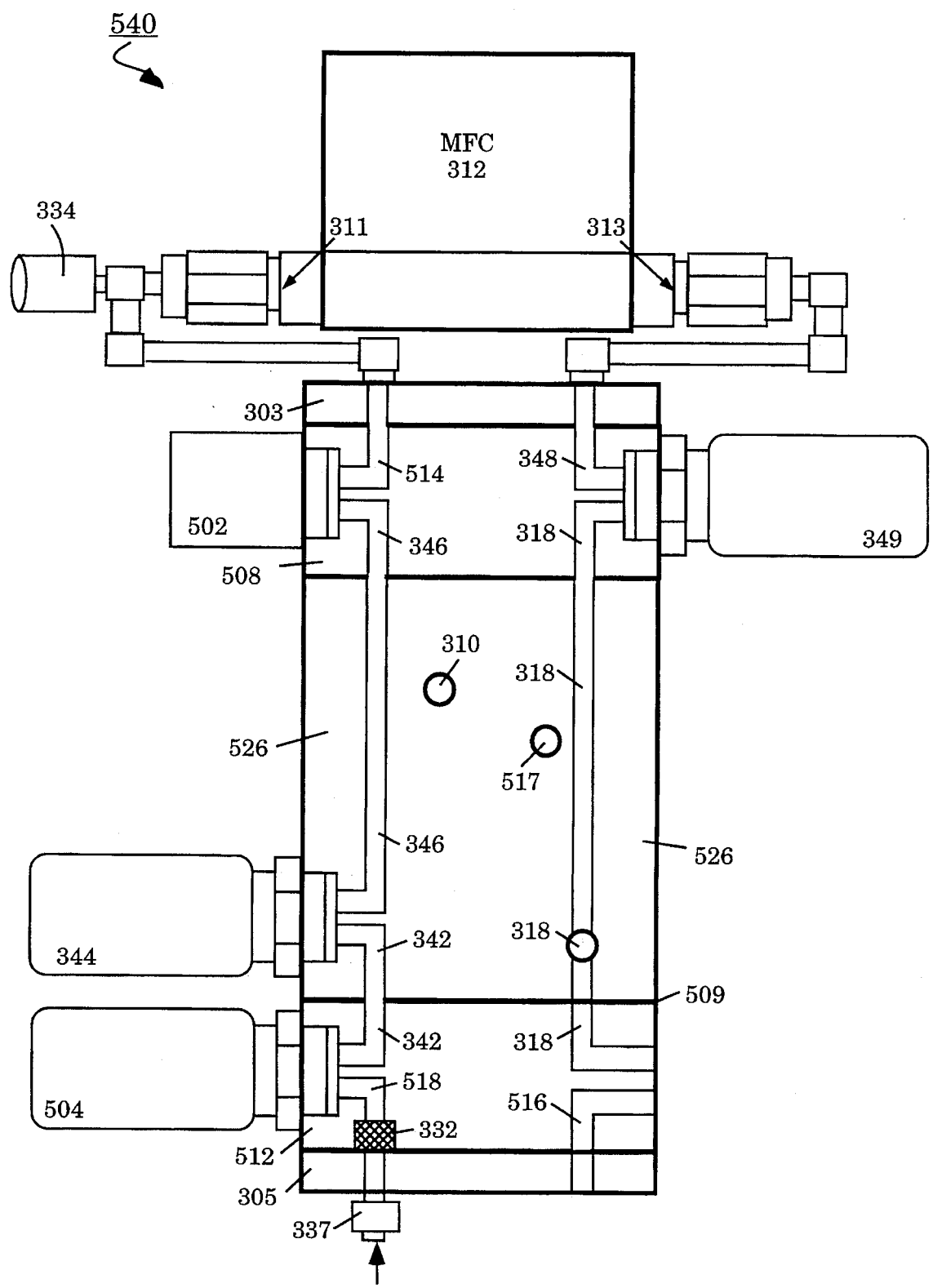
FIG. 5c is an illustration of a preferred three block process gas module without a chamber isolation valve of the present invention.

Shown in FIG. 5c is an inert gas module 540 which includes a manifold 526, an an upper block 508, and a lower block 512. Located in lower block 512 is a LOTO valve 504 coupled between a bottle/source inlet 518 and inert gas inlet 342 which is aligned to inert gas inlet 342 in manifold 526. Like process gas module 500, inert gas module 520 positions mix isolation valve 349 in upper block 522. Manifold 526 is preferably drilled similar to manifold 341 of inert gas module 340. Inert gas module 540 is typically used when an integrated gas panel of the present invention requires a pressure regulator on an inert gas module.

Figure 6:
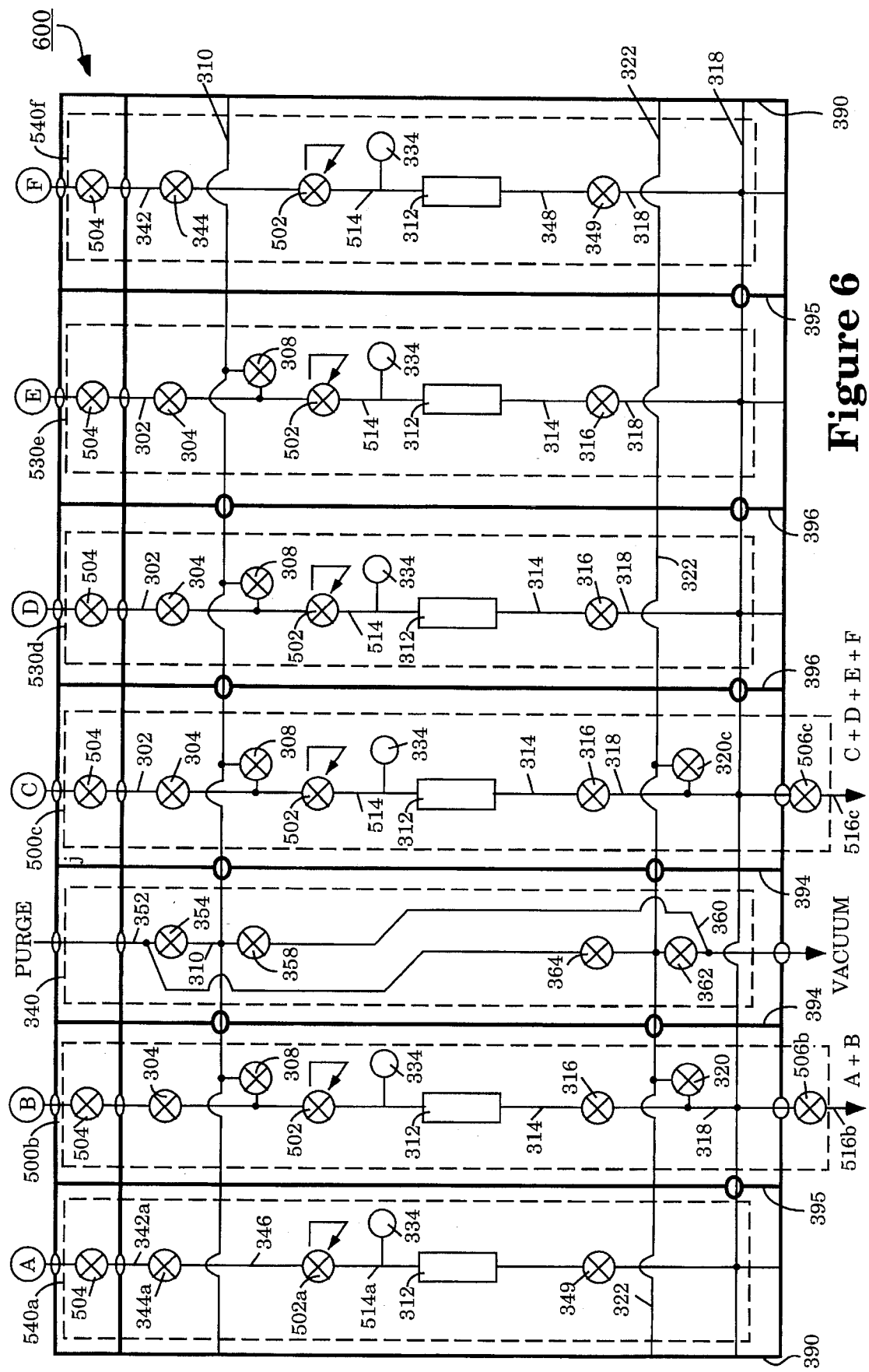
FIG. 6 is an illustration of a functional diagram of a novel integrated gas panel of the present invention.

FIG. 6 is an illustration of an integrated gas panel 600 of the present invention, which is formed by coupling together a plurality of process gas modules 500, a plurality of process gas modules 530, a plurality of inert gas modules 540, and purge gas module 350. Integrated gas panel 600 is characterized by having purge divert port 322 located downstream of mix isolation valves 316. FIG. 6 also shows how an integrated gas panel 600 can be fabricated which includes additional features, such as pressure regulators 506, LOTO valves 504, and chamber isolation valves 506.

As shown in FIG. 6, a blind end gasket 390 is coupled to the outer face of inert gas module 540a and mix gasket with blind purge and divert ports 395, is coupled between inert gas module 520a and process gas module 500b. A mix segregation gasket 394 is coupled between purge gas module 340 and process gas module 500b. As such, an A+B mix is formed in mix port 318, between inert gas module 540a and process gas module 500b. The A/B mix is outputted through chamber isolation valve 506b to chamber feedline 516 where it is sent to a piece of process equipment.

Also shown in FIG. 6 is formation of a second mix segment. A mix segregation gasket 394 is coupled between purge gas module 340 and process gas module 500c. A mix gasket with a blind divert port 396 is coupled between process gas modules 500c and process gas modules 530d, and between process gas module 530d and process gas module 530e. A mix gasket with blind purge and divert ports 395 is coupled between process gas module 530e and inert gas module 540f. A blind end gasket 390 is coupled to exterior face of inert gas module 540f in order to seal off upstream purge port 310, purge divert port 322, and mix port 318. As such, a common mix segment 318 or passage is formed between process gas and inert gas modules 500c, 530d, 530e, and 540f to produce a C+D+E+F mix. The C+D+E+F mix is outputted through chamber isolation valve 506c to chamber feedline 516c where it is provided to a piece of process equipment.

It is to be noted that a common upstream purge port 310 is formed between process gas module 500b, purge gas module 340, process gas module 500c, and process gas modules 530d and 530e. Although, common upstream purge port module 310 could extend the entire length of gas panel 600 if desired, gaskets are used to confine the common upstream purge port 310 to only those locations required. In this way the "wetted surface area" of gas panel 600 is minimized and a clean design obtained. In a similar manner, a common purge divert port 327 is formed only between gas module 500b, purge gas module 340 and process gas module 500c. Minimizing common purge and divert ports reduces purging time and provides a clean gas panel.

The general operation of gas panel 600 is similar to that of gas panel 400, except that gas panel 600 is characterized by having purge divert port 322 located downstream of mix isolation valve 316. Individual process gas modules can be purged or cycle purged individually or as a group in a manner similar to that of gas panel 400. Locating purge divert port 322 downstream of the mix isolation valves means that process gas modules can only be diverted as a group (i.e., process modules 500c, 500d, 500e, and 500f must be diverted together).

It is to be appreciated that gas mix can be diverted in order to vent off gas in order to stabilize gas flows prior to initiating a manufacturing process with new gas mix ratios. Additionally, diverting can be similarly used to provide gas for sampling in order to ensure proper purity and concentration levels of a gas mix.

For example, in order to divert mix segment C+D+E+F in the preferred manner of the present invention, chamber isolation valve 506c is first closed. Purge divert valve 320c and vacuum valve 362 are then opened and mixed gas flows through valves 302c and 362 to vacuum. When flows have stabilized, chamber isolation valve 506c is opened and purge divert valve 320c and vacuum valve 362 are closed. Normal flow is then restored through 506c to the chamber feed.

Although versatility is somewhat lost by requiring all gas modules of a mix segment to be simultaneously diverted, integrated gas panel 600 reduces costs by only utilizing one purge divert valve per mix segment. Additionally, with integrated gas panel 600 a gas mix can easily be diverted by opening only a single divert valve as opposed to multiple valves as is necessary with integrated gas panel 400.

A novel integrated gas panel comprising a plurality of functional modules and gaskets has been described. It is to be appreciated that the integrated gas panel of the present invention is not intended to be limited to the specific modules and/or gaskets described herein, nor to their placement and coupling with respect to one another. It will be obvious from the above detailed description that different modules and gaskets (or other means) can be designed and coupled together to provide added or different features then those specifically described herein. The scope and breadth of the present invention is to be determined by the scope of the appended claims which follow.

Thus, a novel integrated gas panel has been described which is based on a modular design approach, incorporates very little tubing, and which provides all desired functions and capabilities of any modern gas panel.

We claim:

1. An integrated gas panel comprising:
   a first process gas module comprising:
      a first process gas inlet;
      a first upstream isolation valve coupled between said first process gas inlet and a first MFC inlet;
      a first upstream purge port;
      a first upstream purge valve coupled between said first upstream purge port and said first MFC inlet;
      a first mass flow controller (MFC) having an input coupled to said first MFC inlet and an output coupled to a first MFC outlet;
      a first mix isolation valve coupled between said first MFC outlet and a first mix port; and
   a second process gas module comprising:
      a second process gas inlet;
      a second upstream isolation valve coupled between said second process gas inlet and a second MFC inlet;
      a second upstream purge port;
      a second upstream purge valve coupled between said second upstream purge port and said second MFC inlet;
      a second mass flow controller (MFC) having an input coupled to said second MFC inlet and an output coupled to a second MFC outlet;
      a second mix isolation valve coupled between said second MFC outlet and a second mix port;
   wherein said first upstream purge port is coupled to said second upstream purge port and said first mix port is coupled to said second mix port.

2. The integrated gas panel of claim 1 further comprising a gasket coupled between said first module and said second module.

3. The integrated gas panel of claim 1 wherein said gasket isolates said first mix port from said second mix port.

\* \* \* \* \*